United States Patent
Sennett et al.

(10) Patent No.: US 9,148,396 B2
(45) Date of Patent: Sep. 29, 2015

(54) EMERGENCY TEXT MESSAGING

(75) Inventors: DeWayne Sennett, Redmond, WA (US); Brian Daly, Seattle, WA (US); Charles Musgrove, Henderson, NV (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 13/232,381

(22) Filed: Sep. 14, 2011

(65) Prior Publication Data
US 2013/0065549 A1    Mar. 14, 2013

(51) Int. Cl.
*H04W 4/22*    (2009.01)
*H04L 12/58*   (2006.01)
*H04M 1/725*   (2006.01)
*H04W 76/00*   (2009.01)
*H04W 4/12*    (2009.01)
*H04W 88/02*   (2009.01)

(52) U.S. Cl.
CPC ........... *H04L 51/18* (2013.01); *H04M 1/72538* (2013.01); *H04M 1/72552* (2013.01); *H04W 76/007* (2013.01); *H04L 51/38* (2013.01); *H04W 4/12* (2013.01); *H04W 4/22* (2013.01); *H04W 88/02* (2013.01)

(58) Field of Classification Search
CPC . H04W 88/184; H04W 8/186; H04W 76/007; H04W 4/22
See application file for complete search history.

(56) References Cited

U.S. PATENT DOCUMENTS

| | | | | |
|---|---|---|---|---|
| 7,340,240 B2* | 3/2008 | McDonald | | 455/404.1 |
| 7,956,727 B2* | 6/2011 | Loncar | | 340/309.16 |
| 8,350,681 B2* | 1/2013 | Bells | | 340/309.7 |
| 2007/0082652 A1* | 4/2007 | Hartigan et al. | | 455/404.2 |
| 2008/0102785 A1* | 5/2008 | Childress et al. | | 455/404.1 |
| 2008/0119217 A1* | 5/2008 | Coxhill | | 455/550.1 |
| 2009/0222523 A1* | 9/2009 | Williams | | 709/206 |
| 2010/0003959 A1* | 1/2010 | Coppage et al. | | 455/404.2 |
| 2010/0003960 A1* | 1/2010 | Ray et al. | | 455/404.2 |
| 2010/0048159 A1* | 2/2010 | Stenquist | | 455/404.1 |
| 2010/0297981 A1* | 11/2010 | Ballantyne et al. | | 455/404.2 |
| 2012/0034897 A1* | 2/2012 | Kreitzer et al. | | 455/404.1 |
| 2012/0034938 A1* | 2/2012 | Kreitzer et al. | | 455/466 |
| 2012/0282884 A1* | 11/2012 | Sun | | 455/404.2 |

* cited by examiner

*Primary Examiner* — Vladimir Magloire
*Assistant Examiner* — Frank Donado
(74) *Attorney, Agent, or Firm* — Baker & Hostetler LLP

(57) ABSTRACT

Emergency text messaging provides the ability to send and receive partial text-based messages and text messages that were prematurely ended. When a sender of a text message is not able to complete the message, the recipient of the partial/prematurely concluded message is provided information such that the recipient can ascertain that an exceptional condition exists. A text message can be sent on a character-by-character basis, a text message can be sent when a lack of activity is detected for a predetermined amount of time, when a character entry is consecutively repeated a predetermined amount of times or for a predetermined amount of time, or any appropriate combination thereof. The recipient of the text message has the ability to adjust parameters on the device, activate sensors on the device, and/or trigger the transmission of information from the device.

20 Claims, 6 Drawing Sheets

EMERGENCY TEXT MESSAGING

TECHNICAL FIELD

The technical field generally relates to public safety, and more specifically relates to emergency-related text messaging.

BACKGROUND

Text messaging is growing in popularity. This is especially so for hearing impaired persons. Such persons want to be able to utilize Public Safety and Emergency Services (e.g. 9-1-1, etc.). However, there are some limitations of text-based messaging as applied to the Public Safety and Emergency Services area.

SUMMARY

Text-based messaging, as described herein, provides the ability to send and receive partial text-based messages and text messages that were prematurely ended. Accordingly, if a sender of a text-based message is not able to complete the message (e.g., due to emergency conditions, a disability, etc.), the recipient of the partial/prematurely ended message may be able to ascertain that the message was prematurely concluded. The recipient may be able to determine the desired content of message. And, the recipient may be able to deduce that assistance is needed by the sender of the message. For example, in a current hypothetical emergency situation, if a sender of a message does not complete the message, and does not press the send key on his/her communications device, emergency services personnel would not receive the message. However, sending a partial/prematurely concluded message, as described herein, allows the emergency call taker to receive the message, and allows the emergency call taker to deduce information from the message. For example, the sender may have rendered unconscious or otherwise become incapacitated before the text message was completed or sent. The partially completed/prematurely concluded message could provide the 9-1-1 call taker with adequate information to dispatch emergency medical services to the location of the sender.

In various example embodiments, a text message can be sent on a character-by-character basis, a text message can be sent when a lack of activity is detected for a predetermined amount of time, when a character entry is consecutively repeated a predetermined amount of times or for a predetermined amount of time, or any appropriate combination thereof.

In various example embodiments, the recipient (e.g., emergence call taker) of the text message has the ability to adjust parameters on the device, activate sensors on the device, and/or trigger the transmission of information from the device.

DETAILED DESCRIPTION OF ILLUSTRATIVE EMBODIMENTS

Figure 1:
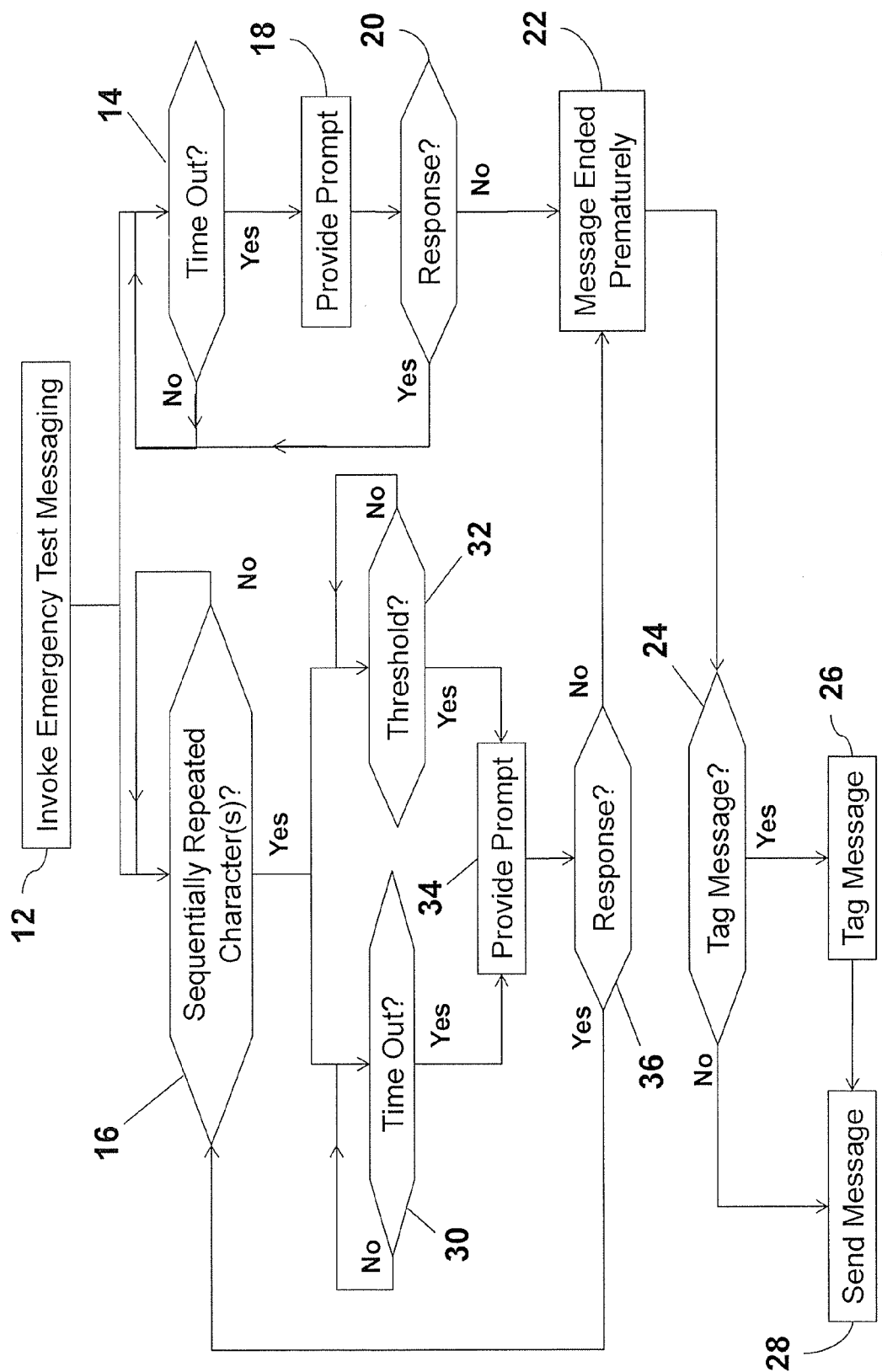
FIG. 1 is a flow diagram of an example process for generating and sending a partial/prematurely concluded text message.

FIG. 1 is a flow diagram of an example process for generating and sending a partial/prematurely concluded text message (also referred to as emergency text messaging herein). Emergency text messaging is invoked at step 12. Emergency text messaging may be invoked in any appropriate manner. Emergency text messaging may be invoked via any appropriate trigger. For example, emergency text messaging can be invoked by starting an application installed on a communications device (e.g., mobile device). The term application, or variants thereof, is used expansively herein to include routines, program modules, programs, components, data structures, algorithms, and the like. Applications can be implemented on various system configurations, including single-processor or multiprocessor systems, minicomputers, mainframe computers, personal computers, hand-held computing devices, communications devices, microprocessor-based, programmable consumer electronics, combinations thereof, or the like.

As another example, emergency text messaging can be invoked by selection of a designated contact. When the application executing on the device detects selection of the contact, the application knows that the session to be established is an emergency communications session and can apply emergency text messaging functionality and emergency-specific handling and processing.

Upon invocation, emergency text messaging can monitor activities on the device to determine if an exceptional condition exists. An exceptional condition can include predetermined period of inactivity and/or entry of sequentially repeated characters. Each of these events can be an indication that a text message may have been ended prematurely. Monitoring for these activities can occur concurrently, as depicted in FIG. 1.

At step 14, activities occurring on the device are monitored to determine if no character is entered for a predetermined amount of time. The predetermined amount of time can be any appropriate amount of time. For example, the predetermined amount of time limit for keyboard input could be fifteen seconds. The amount of time can be a pre-provisioned value in the emergency text messaging application, device, or the like. The amount of time could be configured during installation of the emergency text messaging application. The amount of time could be adjustable by the end user. This may be especially advantageous for individuals with manual dexterity disabilities.

If this time out situation does not occur, activities occurring on the device are continued to be monitored for a time out condition. If the time out condition occurs (step 14), a prompt is provided to the user of the device at step 18. The prompt can be any appropriate prompt (e.g., visual, audio, mechanical vibration, etc.). In an example embodiment, the prompt requests a response. If a response is received by the device, at step 20, activities occurring on the device are continued to be monitored for a time out condition (step 14). If a response is not received at step 20, it is determined that the message has completed prematurely at step 22. For example, an emergency text messaging application executing on a device can detect that there has been no keyboard entry for a specified amount of time, and the emergency text messaging application can prompt the user of the device in order to determine if the period of inactivity is intentional. If no response is received by the device, the emergency text messaging application can automatically send the current contents of a message buffer to the emergency services call-taker specified by the contact. The prompting of the user prior to sending the message buffer contents can help to prevent false alarms to 9-1-1.

It is determined, at step 24, if the message (contents of the message buffer) is to be tagged. For example, the message can be marked with an indication that the message is a partial message and/or the condition that was detected. For example, the tag can indicate that the message was ended prematurely (send button/soft key/voice command was not pressed/issued), the tag can indicate the a time out condition occurred, the tag can indicate that a prompt was provided and no response was received, the tag can indicate that predetermined amount of time associated with the time out, the tag can indicate that a sequentially repeated character(s) was detected (described in more detail below), or any appropriate combination thereof. For example, the emergency text messaging application could tag the partial message as an "incomplete message" or "no user input received for 15 second)", so the emergency call-taker is aware that an exceptional condition (e.g., time-out) has occurred.

If it decided to tag the message (step 24) a tag is applied to the message buffer contents at step 26. The contents of the message buffer along with the tag are sent at step 28. If it decided not to tag the message (step 24) no tag is applied to the message buffer contents. The contents of the message buffer without the tag are sent at step 28.

Concurrent with the above described process, activities can be monitored on the device to determine if entry of sequentially repeated characters is detected at step 16. Repeated characters could be sequentially entered if a user of a device is rendered unconscious and the user is pressing a key on a keyboard, soft key, or the like while unconscious. Repeated characters could be sequentially entered if an occurrence of an event, such as an earthquake, storm, etc., results in a device being jammed in rubble or the like, with a key on a keyboard, soft key, or the like being pressed.

If repeated sequential characters are not detected (step 16), activities occurring on the device are continued to be monitored for repeated sequential characters. If repeated sequential characters are detected (step 16), it is determined at if the characters were repeated for a predetermined amount of time at step 30 or if the number of characters entered exceed a threshold amount of characters at step 32. Steps 30 and 32 can occur concurrently.

The amount of time associated with step 30 can be any appropriate amount of time. For example, the time limit could be fifteen seconds. The amount of time can be a pre-provisioned value in the emergency text messaging application, device, or the like. The amount of time could be configured during installation of the emergency text messaging application. The amount of time could be adjustable by the end user. This may be especially advantageous for individuals with manual dexterity disabilities.

If the time out situation does not occur at step 30, the amount of time that repeated sequential characters are being entered continues to be determined (step 30). If the time out condition occurs (step 30), a prompt is provided to the user of the device at step 34. The prompt can be any appropriate prompt (e.g., visual, audio, mechanical vibration, etc.). In an example embodiment, the prompt requests a response. If a response is received by the device, at step 36, activities occurring on the device are continued to be monitored for repeated sequential characters (step 16). If a response is not received at step 36, it is determined that the message has completed prematurely at step 22.

It is determined, at step 24, if the message (contents of the message buffer) is to be tagged. For example, the message can be marked with an indication that the message is a partial message and/or the condition that was detected. For example, the tag can indicate that repeated sequential characters were detected, the tag can indicate the a time out condition occurred, the tag can indicate that a threshold number of characters was received, the tag can indicate that a prompt was provided and no response was received, the tag can indicate that predetermined amount of time associated with the time out, the tag can indicate the threshold amount of characters, or any appropriate combination thereof. For example, the emergency text messaging application could tag the partial message as an "incomplete message", "repeated characters received for 15 second", or "repeated character threshold exceeded", so the emergency call-taker is aware that an exceptional condition has occurred.

If it is decided to tag the message (step 24) a tag is applied to the message buffer contents at step 26. The contents of the message buffer along with the tag are sent at step 28. If it decided not to tag the message (step 24) no tag is applied to the message buffer contents. The contents of the message buffer without the tag are sent at step 28.

At step 32, it is determined of the number of repeated characters received by the device has exceeded a threshold amount of characters. The threshold amount can be any appropriate amount (e.g., 25 characters). The threshold amount can be a pre-provisioned value in the emergency text messaging application, device, or the like. The threshold amount could be configured during installation of the emergency text messaging application. The threshold amount could be adjustable by the end user. This may be especially advantageous for individuals with manual dexterity disabilities.

If the threshold amount is not exceed at step 32, the number of repeated sequential characters is continued to be determined (step 32). If the threshold amount is exceeded at step 32, the process proceeds to step 34 and continues as described above.

In an example embodiment, the emergence call taker can have options. For example, the call taker could have the ability to adjust the values for the time and/or threshold amounts based upon current condition and scenario. In another example embodiment, the call taker can have the ability to request the retrieval of the current message buffer contents. That is, the transmission of the message buffer contents would be triggered by a command from the call-taker instead of being triggered by the device. In yet another example embodiment, the call taker can have the ability to active a sensor on the device, such as a camera, microphone, location sensor (e.g., GPS), motion sensor, accelerometer, or the like. And, the call taker could have the ability to obtain information obtained via sensors on the device.

Figure 2:
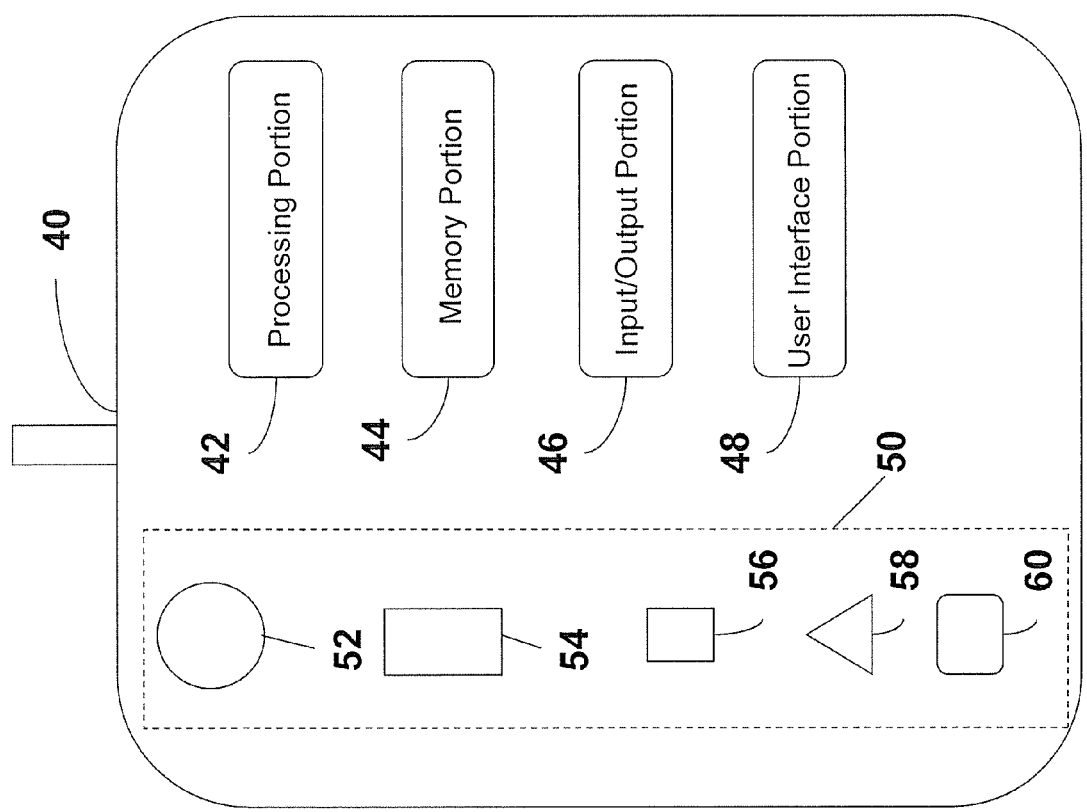
FIG. 2 is a block diagram of an example device 40 configured to implement emergency text messaging.

FIG. 2 is a block diagram of an example device 40 configured to implement text messaging as described herein. The device 40 can include any appropriate device, mechanism, software, and/or hardware for implementing text messaging as described herein. As described herein, the device 40 comprises hardware, or a combination of hardware and software.

And, each portion of the device 40 comprises hardware, or a combination of hardware and software. In an example configuration, the device 40 can comprise a processing portion 42, a memory portion 44, an input/output portion 46, a user interface (UI) portion 48, and a sensor portion 50 comprising at least one of a video camera portion 52, a force/wave sensor 54, a microphone 56, a moisture sensor 58, a compass, 60, or a combination thereof. The force/wave sensor 54 can comprise at least one of a motion detector, an accelerometer, an acoustic sensor, a tilt sensor, a pressure sensor, a temperature sensor, or the like. The motion detector can be configured to detect motion occurring outside of the communications device, for example via disturbance of a standing wave, via electromagnetic and/or acoustic energy, or the like. The accelerator is capable of sensing acceleration, motion, and/or movement of the communications device. The acoustic sensor is capable of sensing acoustic energy, such as a noise, voice, etc., for example. The tilt sensor is capable of detecting a tilt of the communications device. The pressure sensor is capable of sensing pressure against the communications device, such as from a shock wave caused by broken glass or the like. The temperature sensor is capable of sensing a measuring temperature, such as inside of the vehicle, room, building, or the like. The moisture sensor 58 is capable of detecting moisture, such as detecting if the device 40 is submerged in a liquid. The processing portion 42, memory portion 44, input/output portion 46, user interface (UI) portion 48, video camera portion 52, force/wave sensor 54, and microphone 56 are coupled together to allow communications therebetween (coupling not shown in FIG. 2). The device 40 also can comprise a timer (not depicted in FIG. 2).

In various embodiments, the input/output portion 46 comprises a receiver of the device 40, a transmitter of the device 40, or a combination thereof. The input/output portion 46 is capable of, in conjunction with any other portion of the device 40 as needed, receiving and/or providing information pertaining to text messaging as described herein. The input/output portion 46 also is capable of communications with other devices/sensors, as described herein. For example, the input/output portion 46 can include a wireless communications (e.g., 2.5G/3G/4G) SIM card. The input/output portion 46 is capable of receiving and/or sending text information, video information, audio information, control information, image information, data, or any combination thereof. In an example embodiment, the input/output portion 46 is capable of receiving and/or sending information to determine a location of the device 40. In an example configuration, the input\output portion 46 comprises a GPS receiver. In an example configuration, the device 40 can determine its own geographical location through any type of location determination system including, for example, the Global Positioning System (GPS), assisted GPS (A-GPS), time difference of arrival calculations, configured constant location (in the case of non-moving devices), any combination thereof, or any other appropriate means. In various configurations, the input/output portion 46 can receive and/or provide information via any appropriate means, such as, for example, optical means (e.g., infrared), electromagnetic means (e.g., RF, WI-FI, BLUETOOTH, ZIGBEE, etc.), acoustic means (e.g., speaker, microphone, ultrasonic receiver, ultrasonic transmitter), or a combination thereof. In an example configuration, the input/output portion comprises a WIFI finder, a two way GPS chipset or equivalent, or the like.

The processing portion 42 is capable of facilitating text messaging via the device 40, as described herein. The processing portion 42, in conjunction with any other portion of the device 40, can provide the ability for users/subscribers to enable, disable, and configure various features of an application for text messaging, as described herein. The processing portion 42, in conjunction with any other portion of the device 40 as needed, can enable the device 40 to covert speech to text when it is configured to send text messages. In an example embodiment, the processing portion 42, in conjunction with any other portion of the device 40 as needed, can convert text to speech for rendering via the user interface portion 48.

In a basic configuration, the device 40 can include at least one memory portion 44. The memory portion 44 can store any information utilized in conjunction with text messaging via the device 40, as described herein. Depending upon the exact configuration and type of processor, the memory portion 44 can be volatile (such as some types of RAM), non-volatile (such as ROM, flash memory, etc.). The device 40 can include additional storage (e.g., removable storage and/or non-removable storage) including, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or the like. In an example configuration, the memory portion 44, or a portion of the memory portion 42 is hardened such that information stored therein can be recovered if the device 40 is exposed to extreme heat, extreme vibration, extreme moisture, corrosive chemicals or gas, or the like. In an example configuration, the information stored in the hardened portion of the memory portion 44 is encrypted, or otherwise rendered unintelligible without use of an appropriate cryptographic key, password, biometric (voiceprint, fingerprint, retinal image, facial image, or the like). Wherein, use of the appropriate cryptographic key, password, biometric will render the information stored in the hardened portion of the memory portion 44 intelligible.

The device 40 also can contain a UI portion 48 allowing a user to communicate with the device 40. The UI portion 48 is capable of rendering any information utilized in conjunction with text messaging via the device 40, as described herein. For example, the UI portion 48 can provide means for entering text, entering a phone number, rendering text, rendering images, rendering multimedia, rendering sound, rendering video, receiving sound, rendering mechanical vibration, or the like, as described herein. The UI portion 48 can provide the ability to control the device 40, via, for example, buttons, soft keys, voice actuated controls, a touch screen, movement of the mobile device 40, visual cues (e.g., moving a hand or finger in front of a camera on the mobile device 40), or the like. The UI portion 48 can provide visual information (e.g., via a display), audio information (e.g., via speaker), mechanically (e.g., via a vibrating mechanism), or a combination thereof. In various configurations, the UI portion 48 can comprise a display, a touch screen, a keyboard, a speaker, or any combination thereof. The UI portion 48 can comprise means for inputting biometric information, such as, for example, fingerprint information, retinal information, voice information, and/or facial characteristic information. The UI portion 48 can be utilized to enter an indication of the designated destination (e.g., the phone number, IP address, geographic information, or the like).

In an example embodiment, the sensor portion 50 of the device 40 comprises the video camera portion 52, the force/wave sensor 54, and the microphone 56. The video camera portion 52 comprises a camera (or cameras) and associated equipment capable of capturing still images and/or video and to provide the captured still images and/or video to other portions of the device 40. In an example embodiment, the force/wave sensor 54 comprises an accelerometer, a tilt sensor, an acoustic sensor capable of sensing acoustic energy, an optical sensor (e.g., infrared), or any combination thereof.

The device 40 can be part of and/or in communications with various wireless communications networks. Some of which are described below.

Figure 3:
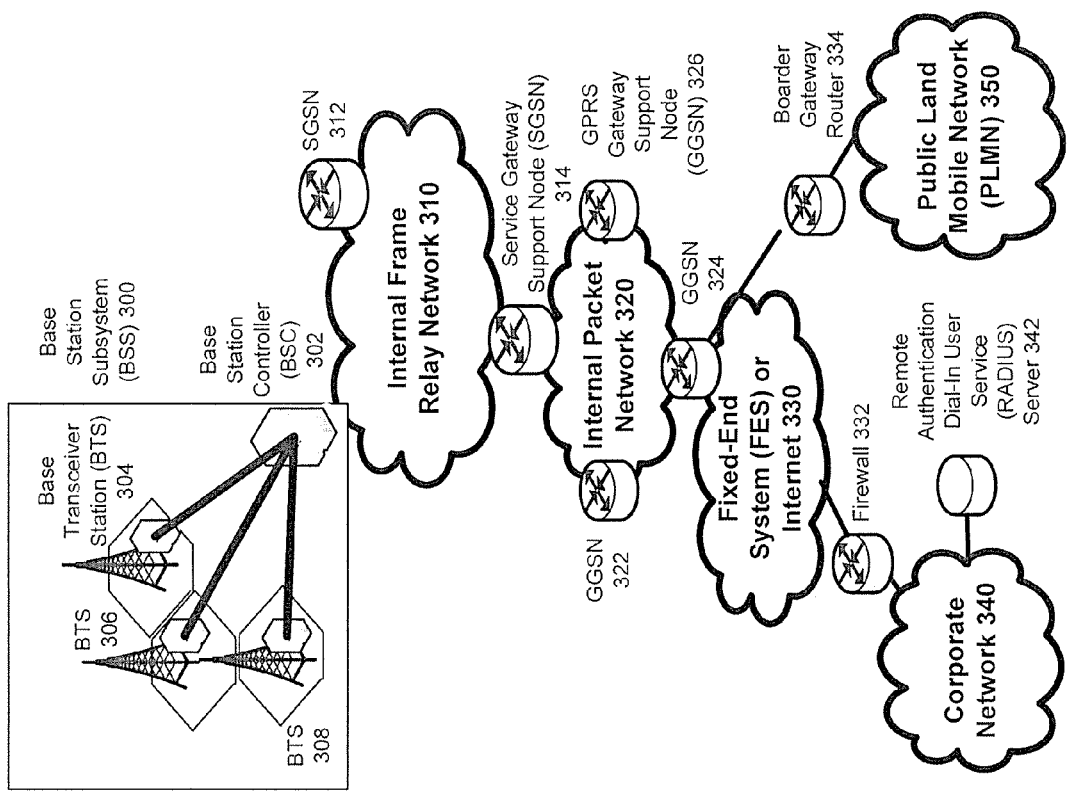
FIG. 3 depicts an overall block diagram of an exemplary packet-based mobile cellular network environment, such as a GPRS network, in which emergency text messaging can be implemented.

FIG. 3 depicts an overall block diagram of an exemplary packet-based mobile cellular network environment, such as a GPRS network, in which emergency text messaging can be implemented. In the exemplary packet-based mobile cellular network environment shown in FIG. 3, there are a plurality of Base Station Subsystems ("BSS") 300 (only one is shown), each of which comprises a Base Station Controller ("BSC") 302 serving a plurality of Base Transceiver Stations ("BTS") such as BTSs 304, 306, and 308. BTSs 304, 306, 308, etc. are the access points where users of packet-based mobile devices become connected to the wireless network. In exemplary fashion, the packet traffic originating from user devices is transported via an over-the-air interface to a BTS 308, and from the BTS 308 to the BSC 302. Base station subsystems, such as BSS 300, are a part of internal frame relay network 310 that can include Service GPRS Support Nodes ("SGSN") such as SGSN 312 and 314. Each SGSN is connected to an internal packet network 320 through which a SGSN 312, 314, etc. can route data packets to and from a plurality of gateway GPRS support nodes (GGSN) 322, 324, 326, etc. As illustrated, SGSN 314 and GGSNs 322, 324, and 326 are part of internal packet network 320. Gateway GPRS serving nodes 322, 324 and 326 mainly provide an interface to external Internet Protocol ("IP") networks such as Public Land Mobile Network ("PLMN") 350, corporate intranets 340, or Fixed-End System ("FES") or the public Internet 330. As illustrated, subscriber corporate network 340 may be connected to GGSN 324 via firewall 332; and PLMN 350 is connected to GGSN 324 via boarder gateway router 334. The Remote Authentication Dial-In User Service ("RADIUS") server 342 may be used for caller authentication when a user of a mobile cellular device calls corporate network 340.

Generally, there can be a several cell sizes in a GSM network, referred to as macro, micro, pico, femto and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. Femto cells have the same size as pico cells, but a smaller transport capacity. Femto cells are used indoors, in residential, or small business environments. On the other hand, umbrella cells are used to cover shadowed regions of smaller cells and fill in gaps in coverage between those cells.

Figure 4:
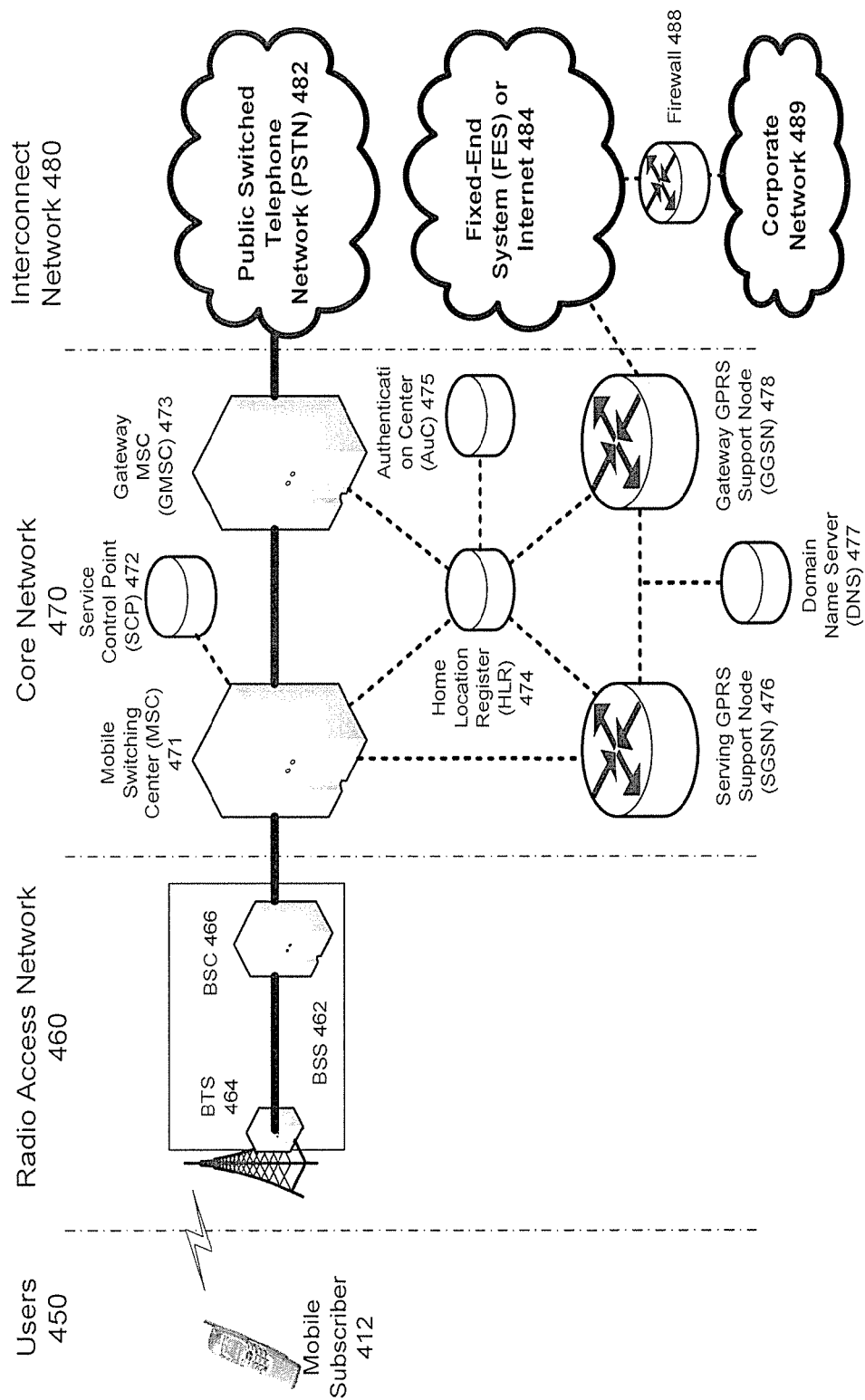
FIG. 4 illustrates an architecture of a typical GPRS network in which emergency text messaging can be implemented.

FIG. 4 illustrates an architecture of a typical GPRS network in which emergency text messaging can be implemented. The architecture depicted in FIG. 4 is segmented into four groups: users 450, radio access network 460, core network 470, and interconnect network 480. Users 450 comprise a plurality of end users. Note, device 412 is referred to as a mobile subscriber in the description of network shown in FIG. 4. In an example embodiment, the device depicted as mobile subscriber 412 comprises a communications device (e.g., wireless anti-theft security communications device 14). Radio access network 460 comprises a plurality of base station subsystems such as BSSs 462, which include BTSs 464 and BSCs 466. Core network 470 comprises a host of various network elements. As illustrated in FIG. 4, core network 470 may comprise Mobile Switching Center ("MSC") 471, Service Control Point ("SCP") 472, gateway MSC 473, SGSN 476, Home Location Register ("HLR") 474, Authentication Center ("AuC") 475, Domain Name Server ("DNS") 477, and GGSN 478. Interconnect network 480 also comprises a host of various networks and other network elements. As illustrated in FIG. 4, interconnect network 480 comprises Public Switched Telephone Network ("PSTN") 482, Fixed-End System ("FES") or Internet 484, firewall 488, and Corporate Network 489.

A mobile switching center can be connected to a large number of base station controllers. At MSC 471, for instance, depending on the type of traffic, the traffic may be separated in that voice may be sent to Public Switched Telephone Network ("PSTN") 482 through Gateway MSC ("GMSC") 473, and/or data may be sent to SGSN 476, which then sends the data traffic to GGSN 478 for further forwarding.

When MSC 471 receives call traffic, for example, from BSC 466, it sends a query to a database hosted by SCP 472. The SCP 472 processes the request and issues a response to MSC 471 so that it may continue call processing as appropriate.

The HLR 474 is a centralized database for users to register to the GPRS network. HLR 474 stores static information about the subscribers such as the International Mobile Subscriber Identity ("IMSI"), subscribed services, and a key for authenticating the subscriber. HLR 474 also stores dynamic subscriber information such as the current location of the mobile subscriber. Associated with HLR 474 is AuC 475. AuC 475 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 4, when mobile subscriber 412 initiates the attach process by turning on the network capabilities of the mobile device, an attach request is sent by mobile subscriber 412 to SGSN 476. The SGSN 476 queries another SGSN, to which mobile subscriber 412 was attached before, for the identity of mobile subscriber 412. Upon receiving the identity of mobile subscriber 412 from the other SGSN, SGSN 476 requests more information from mobile subscriber 412. This information is used to authenticate mobile subscriber 412 to SGSN 476 by HLR 474. Once verified, SGSN 476 sends a location update to HLR 474 indicating the change of location to a new SGSN, in this case SGSN 476. HLR 474 notifies the old SGSN, to which mobile subscriber 412 was attached before, to cancel the location process for mobile subscriber 412. HLR 474 then notifies SGSN 476 that the location update has been performed. At this time, SGSN 476 sends an Attach Accept message to mobile subscriber 412, which in turn sends an Attach Complete message to SGSN 476.

After attaching itself with the network, mobile subscriber 412 then goes through the authentication process. In the authentication process, SGSN 476 sends the authentication information to HLR 474, which sends information back to SGSN 476 based on the user profile that was part of the user's initial setup. The SGSN 476 then sends a request for authentication and ciphering to mobile subscriber 412. The mobile subscriber 412 uses an algorithm to send the user identification (ID) and password to SGSN 476. The SGSN 476 uses the same algorithm and compares the result. If a match occurs, SGSN 476 authenticates mobile subscriber 412.

Next, the mobile subscriber 412 establishes a user session with the destination network, corporate network 489, by going through a Packet Data Protocol ("PDP") activation process. Briefly, in the process, mobile subscriber 412 requests access to the Access Point Name ("APN"), for example, UPS.com, and SGSN 476 receives the activation request from mobile subscriber 412. SGSN 476 then initiates a Domain Name Service ("DNS") query to learn which GGSN node has access to the UPS.com APN. The DNS query is sent to the DNS server within the core network 470, such as DNS 477, which is provisioned to map to one or more GGSN nodes in the core network 470. Based on the APN, the mapped GGSN 478 can access the requested corporate network 489. The SGSN 476 then sends to GGSN 478 a Create Packet Data Protocol ("PDP") Context Request message that contains necessary information. The GGSN 478 sends a Create PDP Context Response message to SGSN 476, which then sends an Activate PDP Context Accept message to mobile subscriber 412.

Once activated, data packets of the call made by mobile subscriber 412 can then go through radio access network 460, core network 470, and interconnect network 480, in a particular fixed-end system or Internet 484 and firewall 488, to reach corporate network 489.

Figure 5:
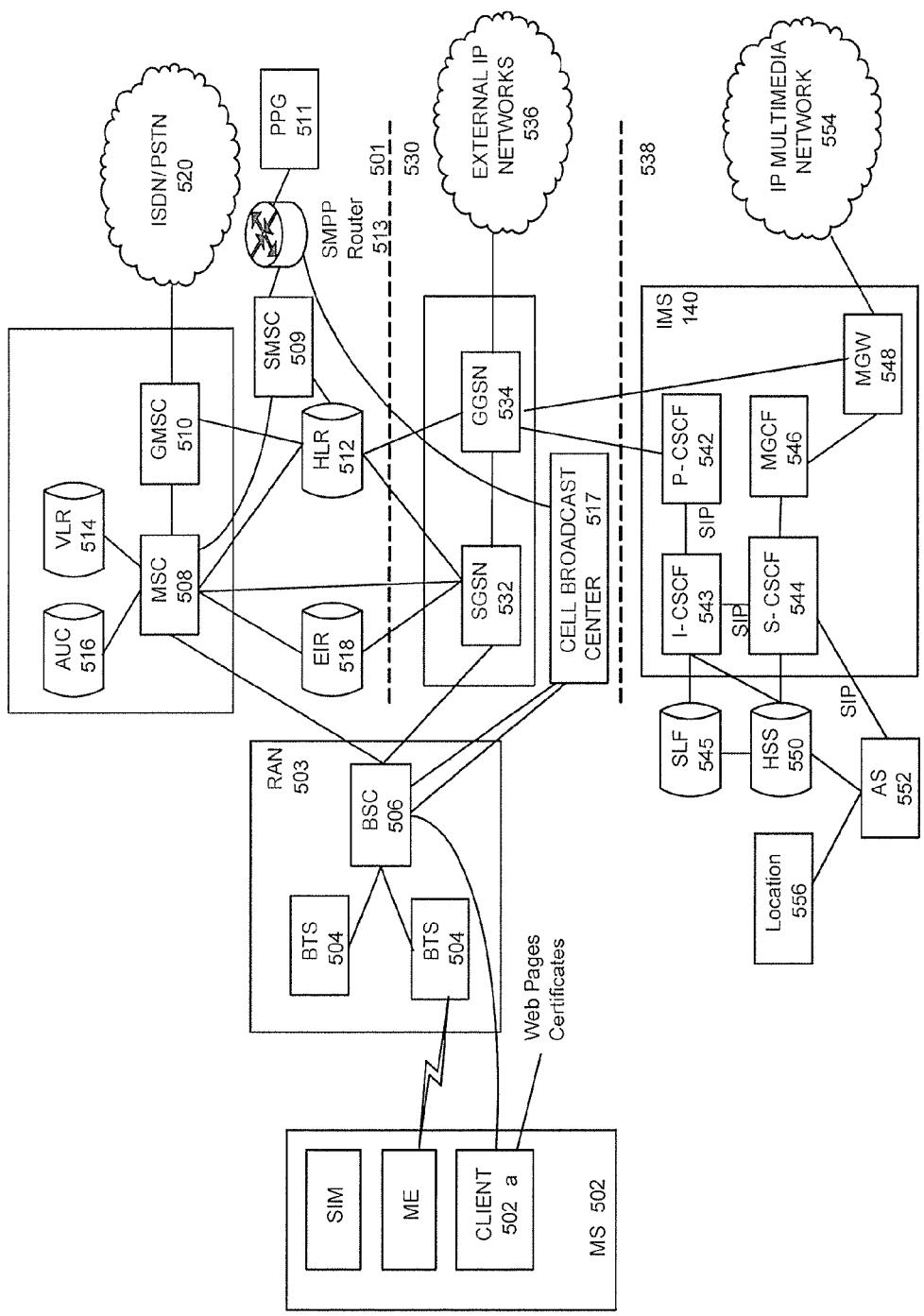
FIG. 5 illustrates an exemplary block diagram view of a GSM/GPRS/IP multimedia network architecture within which emergency text messaging can be implemented.

FIG. 5 illustrates an exemplary block diagram view of a GSM/GPRS/IP multimedia network architecture within which emergency text messaging can be implemented. As illustrated, the architecture of FIG. 5 includes a GSM core network 501, a GPRS network 530 and an IP multimedia network 538. The GSM core network 501 includes a Mobile Station (MS) 502, at least one Base Transceiver Station (BTS) 504 and a Base Station Controller (BSC) 506. The MS 502 is physical equipment or Mobile Equipment (ME), such as a mobile phone or a laptop computer that is used by mobile subscribers, with a Subscriber identity Module (SIM) or a Universal Integrated Circuit Card (UICC). The SIM or UICC includes an International Mobile Subscriber Identity (IMSI), which is a unique identifier of a subscriber. The BTS 504 is physical equipment, such as a radio tower, that enables a radio interface to communicate with the MS. Each BTS may serve more than one MS. The BSC 506 manages radio resources, including the BTS. The BSC may be connected to several BTSs. The BSC and BTS components, in combination, are generally referred to as a base station (BSS) or radio access network (RAN) 503.

The GSM core network 501 also includes a Mobile Switching Center (MSC) 508, a Gateway Mobile Switching Center (GMSC) 510, a Home Location Register (HLR) 512, Visitor Location Register (VLR) 514, an Authentication Center (AuC) 518, and an Equipment Identity Register (EIR) 516. The MSC 508 performs a switching function for the network. The MSC also performs other functions, such as registration, authentication, location updating, handovers, and call routing. The GMSC 510 provides a gateway between the GSM network and other networks, such as an Integrated Services Digital Network (ISDN) or Public Switched Telephone Networks (PSTNs) 520. Thus, the GMSC 510 provides interworking functionality with external networks.

The HLR 512 is a database that contains administrative information regarding each subscriber registered in a corresponding GSM network. The HLR 512 also contains the current location of each MS. The VLR 514 is a database that contains selected administrative information from the HLR 512. The VLR contains information necessary for call control and provision of subscribed services for each MS currently located in a geographical area controlled by the VLR. The HLR 512 and the VLR 514, together with the MSC 508, provide the call routing and roaming capabilities of GSM. The AuC 516 provides the parameters needed for authentication and encryption functions. Such parameters allow verification of a subscriber's identity. The EIR 518 stores security-sensitive information about the mobile equipment.

A Short Message Service Center (SMSC) 509 allows one-to-one Short Message Service (SMS) messages to be sent to/from the MS 502. A Push Proxy Gateway (PPG) 511 is used to "push" (i.e., send without a synchronous request) content to the MS 502. The PPG 511 acts as a proxy between wired and wireless networks to facilitate pushing of data to the MS 502. A Short Message Peer to Peer (SMPP) protocol router 513 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 502 sends a location update including its current location information to the MSC/VLR, via the BTS 504 and the BSC 506. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 530 is logically implemented on the GSM core network architecture by introducing two packet-switching network nodes, a serving GPRS support node (SGSN) 532, a cell broadcast and a Gateway GPRS support node (GGSN) 534. The SGSN 532 is at the same hierarchical level as the MSC 508 in the GSM network. The SGSN controls the connection between the GPRS network and the MS 502. The SGSN also keeps track of individual MS's locations and security functions and access controls.

A Cell Broadcast Center (CBC) 517 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 534 provides a gateway between the GPRS network and a public packet network (PDN) or other IP networks 536. That is, the GGSN provides interworking functionality with external networks, and sets up a logical link to the MS through the SGSN. When packet-switched data leaves the GPRS network, it is transferred to an external TCP-IP network 536, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one of three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class CMS.

A GPRS network 530 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not receive pages from a circuit switched domain when engaged in a data call, since the MS is receiving data and is not listening to a paging channel. In a NOM3 network, a MS can monitor pages for a circuit switched network while received data and vice versa.

The IP multimedia network 538 was introduced with 3GPP Release 5, and includes an IP multimedia subsystem (IMS) 540 to provide rich multimedia services to end users. A representative set of the network entities within the IMS 540 are a call/session control function (CSCF), a media gateway control function (MGCF) 546, a media gateway (MGW) 548, and a master subscriber database, called a home subscriber server (HSS) 550. The HSS 550 may be common to the GSM network 501, the GPRS network 530 as well as the IP multimedia network 538.

The IP multimedia system 540 is built around the call/session control function, of which there are three types: an interrogating CSCF (I-CSCF) 543, a proxy CSCF (P-CSCF) 542, and a serving CSCF (S-CSCF) 544. The P-CSCF 542 is the MS's first point of contact with the IMS 540. The P-CSCF 542 forwards session initiation protocol (SIP) messages received from the MS to an SIP server in a home network (and vice versa) of the MS. The P-CSCF 542 may also modify an outgoing request according to a set of rules defined by the network operator (for example, address analysis and potential modification).

The I-CSCF 543, forms an entrance to a home network and hides the inner topology of the home network from other networks and provides flexibility for selecting an S-CSCF. The I-CSCF 543 may contact a subscriber location function (SLF) 545 to determine which HSS 550 to use for the particular subscriber, if multiple HSS's 550 are present. The S-CSCF 544 performs the session control services for the MS 502. This includes routing originating sessions to external networks and routing terminating sessions to visited networks. The S-CSCF 544 also decides whether an application server (AS) 552 is required to receive information on an incoming SIP session request to ensure appropriate service handling. This decision is based on information received from the HSS 550 (or other sources, such as an application server 552). The AS 552 also communicates to a location server 556 (e.g., a Gateway Mobile Location Center (GMLC)) that provides a position (e.g., latitude/longitude coordinates) of the MS 502.

The HSS 550 contains a subscriber profile and keeps track of which core network node is currently handling the subscriber. It also supports subscriber authentication and authorization functions (AAA). In networks with more than one HSS 550, a subscriber location function provides information on the HSS 550 that contains the profile of a given subscriber.

The MGCF 546 provides interworking functionality between SIP session control signaling from the IMS 540 and ISUP/BICC call control signaling from the external GSTN networks (not shown). It also controls the media gateway (MGW) 548 that provides user-plane interworking functionality (e.g., converting between AMR- and PCM-coded voice). The MGW 548 also communicates with other IP multimedia networks 554.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

Figure 6:
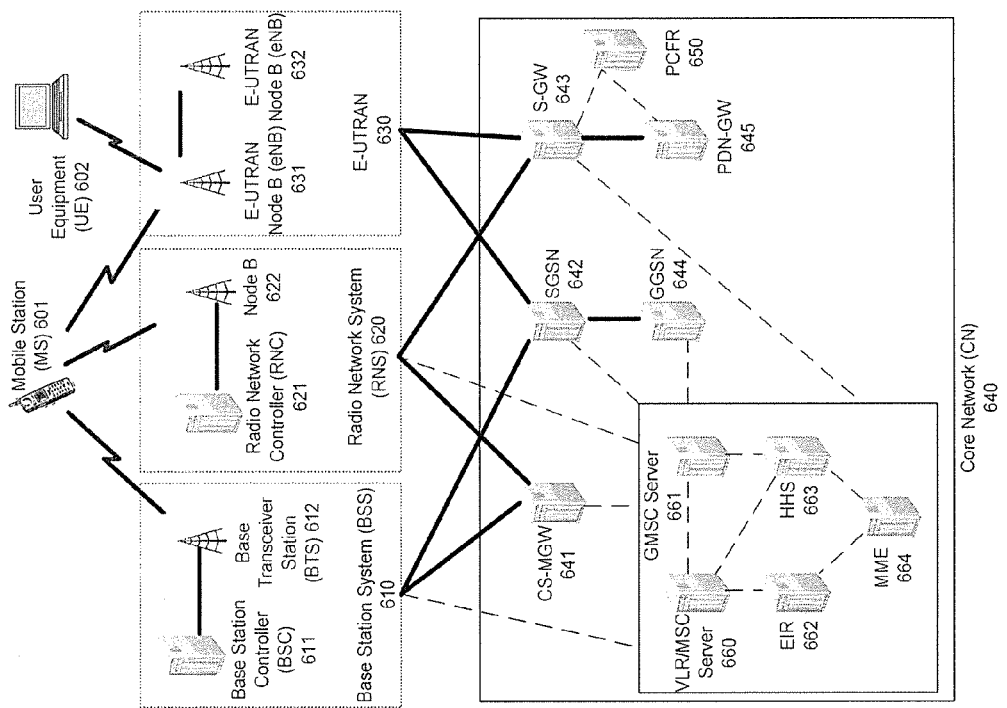
FIG. 6 illustrates a PLMN block diagram view of an exemplary architecture in which emergency text messaging may be incorporated.

FIG. 6 illustrates a PLMN block diagram view of an exemplary architecture in which emergency text messaging may be incorporated. Mobile Station (MS) 601 is the physical equipment used by the PLMN subscriber. In one illustrative embodiment, communications device 40 may serve as Mobile Station 601. Mobile Station 601 may be one of, but not limited to, a cellular telephone, a cellular telephone in combination with another electronic device or any other wireless mobile communication device.

Mobile Station 601 may communicate wirelessly with Base Station System (BSS) 610. BSS 610 contains a Base Station Controller (BSC) 611 and a Base Transceiver Station (BTS) 612. BSS 610 may include a single BSC 611/BTS 612 pair (Base Station) or a system of BSC/BTS pairs which are part of a larger network. BSS 610 is responsible for communicating with Mobile Station 601 and may support one or more cells. BSS 610 is responsible for handling cellular traffic and signaling between Mobile Station 601 and Core Network 640. Typically, BSS 610 performs functions that include, but are not limited to, digital conversion of speech channels, allocation of channels to mobile devices, paging, and transmission/reception of cellular signals.

Additionally, Mobile Station 601 may communicate wirelessly with Radio Network System (RNS) 620. RNS 620 contains a Radio Network Controller (RNC) 621 and one or more Node(s) B 622. RNS 620 may support one or more cells. RNS 620 may also include one or more RNC 621/Node B 622 pairs or alternatively a single RNC 621 may manage multiple Nodes B 622. RNS 620 is responsible for communicating with Mobile Station 601 in its geographically defined area. RNC 621 is responsible for controlling the Node(s) B 622 that are connected to it and is a control element in a UMTS radio access network. RNC 621 performs functions such as, but not limited to, load control, packet scheduling, handover control, security functions, as well as controlling Mobile Station 601's access to the Core Network (CN) 640.

The evolved UMTS Terrestrial Radio Access Network (E-UTRAN) 630 is a radio access network that provides wireless data communications for Mobile Station 601 and User Equipment 602. E-UTRAN 630 provides higher data rates than traditional UMTS. It is part of the Long Term Evolution (LTE) upgrade for mobile networks and later releases meet the requirements of the International Mobile Telecommunications (IMT) Advanced and are commonly known as a 4G networks. E-UTRAN 630 may include of series of logical network components such as E-UTRAN Node B (eNB) 631 and E-UTRAN Node B (eNB) 632. E-UTRAN 630 may contain one or more eNBs. User Equipment 602 may be any user device capable of connecting to E-UT- RAN 630 including, but not limited to, a personal computer, laptop, mobile device, wireless router, or other device capable of wireless connectivity to E-UTRAN 630. The improved performance of the E-UTRAN 630 relative to a typical UMTS network allows for increased bandwidth, spectral efficiency, and functionality including, but not limited to, voice, high-speed applications, large data transfer and IPTV, while still allowing for full mobility.

An exemplary embodiment of a mobile data and communication service that may be implemented in the PLMN architecture described in FIG. 6 is the Enhanced Data rates for GSM Evolution (EDGE). EDGE is an enhancement for GPRS networks that implements an improved signal modulation scheme known as 6-PSK (Phase Shift Keying). By increasing network utilization, EDGE may achieve up to three times faster data rates as compared to a typical GPRS network. EDGE may be implemented on any GSM network capable of hosting a GPRS network, making it an ideal upgrade over GPRS since it may provide increased functionality of existing network resources. Evolved EDGE networks are becoming standardized in later releases of the radio telecommunication standards, which provide for even greater efficiency and peak data rates of up to 1 Mbit/s, while still allowing implementation on existing GPRS-capable network infrastructure.

Typically Mobile Station 601 may communicate with any or all of BSS 610, RNS 620, or E-UTRAN 630. In a illustrative system, each of BSS 610, RNS 620, and E-UTRAN 630 may provide Mobile Station 601 with access to Core Network 640. The Core Network 640 may include of a series of devices that route data and communications between end users. Core Network 640 may provide network service functions to users in the Circuit Switched (CS) domain, the Packet Switched (PS) domain or both. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The Circuit Switched—Media Gateway Function (CS-MGW) 641 is part of Core Network 640, and interacts with Visitor Location Register (VLR) and Mobile-Services Switching Center (MSC) Server 660 and Gateway MSC Server 661 in order to facilitate Core Network 640 resource control in the CS domain. Functions of CS-MGW 641 include, but are not limited to, media conversion, bearer control, payload processing and other mobile network processing such as handover or anchoring. CS-MGW 640 may receive connections to Mobile Station 601 through BSS 610, RNS 620 or both.

Serving GPRS Support Node (SGSN) 642 stores subscriber data regarding Mobile Station 601 in order to facilitate network functionality. SGSN 642 may store subscription information such as, but not limited to, the International Mobile Subscriber Identity (IMSI), temporary identities, or Packet Data Protocol (PDP) addresses. SGSN 642 may also store location information such as, but not limited to, the Gateway GPRS Support Node (GGSN) 644 address for each GGSN where an active PDP exists. GGSN 644 may implement a location register function to store subscriber data it receives from SGSN 642 such as subscription or location information.

Serving Gateway (S-GW) 643 is an interface which provides connectivity between E-UTRAN 630 and Core Network 640. Functions of S-GW 643 include, but are not limited to, packet routing, packet forwarding, transport level packet processing, event reporting to Policy and Charging Rules Function (PCRF) 650, and mobility anchoring for inter-network mobility. PCRF 650 uses information gathered from S-GW 643, as well as other sources, to make applicable policy and charging decisions related to data flows, network resources and other network administration functions. Packet Data Network Gateway (PDN-GW) 645 may provide user-to-services connectivity functionality including, but not limited to, network-wide mobility anchoring, bearer session anchoring and control, and IP address allocation for PS domain connections.

Home Subscriber Server (HSS) 663 is a database for user information, and stores subscription data regarding Mobile Station 601 or User Equipment 602 for handling calls or data sessions. Networks may contain one HSS 663 or more if additional resources are required. Exemplary data stored by HSS 663 include, but is not limited to, user identification, numbering and addressing information, security information, or location information. HSS 663 may also provide call or session establishment procedures in both the PS and CS domains.

The VLR/MSC Server 660 provides user location functionality. When Mobile Station 601 enters a new network location, it begins a registration procedure. A MSC Server for that location transfers the location information to the VLR for the area. A VLR and MSC Server may be located in the same computing environment, as is shown by VLR/MSC Server 660, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for Mobile Station 601 registration or procedures for handover of Mobile Station 601 to a different section of the Core Network 640. GMSC Server 661 may serve as a connection to alternate GMSC Servers for other mobile stations in larger networks.

Equipment Identity Register (EIR) 662 is a logical element which may store the International Mobile Equipment Identities (IMEI) for Mobile Station 601. In a typical embodiment, user equipment may be classified as either "white listed" or "black listed" depending on its status in the network. In one embodiment, if Mobile Station 601 is stolen and put to use by an unauthorized user, it may be registered as "black listed" in EIR 662, preventing its use on the network. Mobility Management Entity (MME) 664 is a control node which may track Mobile Station 601 or User Equipment 602 if the devices are idle. Additional functionality may include the ability of MME 664 to contact an idle Mobile Station 601 or User Equipment 602 if retransmission of a previous session is required.

While example embodiments of emergency text messaging have been described in connection with various computing devices/processors, the underlying concepts can be applied to any computing device, processor, or system capable of emergency text messaging as described herein. The methods and apparatuses for emergency text messaging, or certain aspects or portions thereof, can take the form of program code (i.e., instructions) embodied in tangible storage media having a physical structure, such as floppy diskettes, CD-ROMs, hard drives, or any other machine-readable storage medium having a physical tangible structure (computer-readable storage medium), wherein, when the program code is loaded into and executed by a machine, such as a computer, the machine becomes an apparatus for emergency text messaging. A computer-readable storage medium, as described herein is an article of manufacture, and thus, not to be construed as a transient signal. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and apparatuses for emergency text messaging can be practiced via communications embodied in the form of program code that is transmitted over some transmission medium, such as over electrical wiring or cabling, through fiber optics, wherein, when the program code is received and loaded into and executed by a machine, such as an EPROM, a gate array, a programmable logic device (PLD), a client computer, or the like, the machine becomes an apparatus for emergency text messaging. When implemented on a general-purpose processor, the program code combines with the processor to provide a unique apparatus that operates to invoke the functionality of emergency text messaging.

While d emergency text messaging has been described in connection with the various embodiments of the various figures, it is to be understood that other similar embodiments can be used or modifications and additions can be made to the described embodiments for emergency text messaging. For example, one skilled in the art will recognize that emergency text messaging as described in the instant application may apply to any environment, whether wired or wireless, and may be applied to any number of devices connected via a communications network and interacting across the network. Therefore, emergency text messaging should not be limited to any single embodiment, but rather should be construed in breadth and scope in accordance with the appended claims.

What is claimed:

1. A method comprising:
   determining, by a mobile device while generating a message, that the message is a partial message;
   determining at least one type of an exceptional condition from a plurality of types of exceptional conditions,
   the plurality of types of exceptional conditions consisting of:
   generation of the message ended prematurely;
   a time out condition occurred on the mobile device;
   a response from the mobile device to a prompt was not received;
   inactivity on the mobile device for a predetermined amount of time;
   and sequentially repeated characters entered on the mobile device;
   generating, by the mobile device, a tag indicative of the at least one type of the exceptional condition; combining the tag with the current contents of the message; and sending the combined tag and current contents of the message.

2. The method of claim 1, wherein the exceptional condition comprises inactivity for the predetermined amount of time.

3. The method of claim 1, wherein the exceptional condition comprises unintentionally sequentially repeated characters.

4. The method of claim 1, wherein the exceptional condition comprises a number of sequentially repeated characters exceeding a threshold amount of characters.

5. The method of claim 1, wherein the exceptional condition comprises sequentially repeated characters being received for a predetermined amount of time.

6. The method of claim 1, further comprising:
   providing a prompt to determine if an indication of an exceptional condition is intentional.

7. The method of claim 6, further comprising:
   determining that an exceptional condition exists when a response to the prompt is not received.

8. The method of claim 1, further comprising:
   adding to the combined tag and current contents of the message, and the express indication of the exceptional condition, an indication that the exceptional condition exists.

9. A mobile device comprising:
   a processor; and memory coupled to the processor, the memory comprising executable instructions that when executed by the processor cause the processor to effectuate operations comprising:
   determining, by the mobile device while generating a message, that the message is a partial message;
   determining at least one type of an exceptional condition from a plurality of types of exceptional conditions, the plurality of types of exceptional conditions
   consisting of:
   generation of the message ended prematurely;
   a time out condition occurred on the mobile device;
   a response from the mobile device to a prompt was not received;
   inactivity on the mobile device for a predetermined amount of time;
   and sequentially repeated characters entered on the mobile device;
   generating a tag indicative of the at least one type of the exceptional condition and that the message is a partial message; combining the tag with the current contents of the message; and sending the combined tag and current contents of the message.

10. The mobile device of claim 9, wherein the exceptional condition comprises inactivity for predetermined amount of time.

11. The mobile device of claim 9, wherein the exceptional condition comprises unintentionally sequentially repeated characters.

12. The mobile device of claim 11, wherein the exceptional condition comprises sequentially repeated characters being received for a predetermined amount of time.

13. The mobile device of claim 9, wherein the exceptional condition comprises a number of sequentially repeated characters exceeding a threshold amount of characters.

14. The mobile device of claim 9, the operations further comprising:
   providing a prompt to determine if an indication of an exceptional condition is intentional.

15. The mobile device of claim 9, the operations further comprising:
   determining that an exceptional condition exists when a response to the prompt is not received.

16. The mobile device of claim 9, the operations further comprising:
   adding to the combined tag and current contents of the message, and the express indication of the exceptional condition, an indication that the exceptional condition exists.

17. A computer-readable storage medium comprising instructions that when executed by a processor, cause the processor to effectuate operations comprising determining, by the mobile device while generating a message, that the message is a partial message;
  determining at least one type of an exceptional condition from a plurality of types of exceptional conditions, the plurality of types of exceptional conditions consisting of:
  generation of the message ended prematurely;
  a time out condition occurred on the mobile device;
  a response from the mobile device to a prompt was not received;
  inactivity on the mobile device for a predetermined amount of time;
  and sequentially repeated characters entered on the mobile device;
  generating, by the mobile device, a tag indicative of the at least one type of the exceptional condition and that the message is a partial message; combining the tag with the current contents of the message; and sending the combined tag and current contents of the message.

18. The computer-readable storage medium of claim 17, wherein the exceptional condition comprises at least one of:
  inactivity for the predetermined amount of time; or
  sequentially repeated characters.

19. The computer-readable storage medium of claim 17, the operations further comprising:
  providing a prompt to determine if an indication of an exceptional condition is intentional.

20. The computer-readable storage medium of claim 17, the operations further comprising:
  adding to the combined tag and current contents of the message, and the express indication of the exceptional condition, an indication that the exceptional condition exists.

* * * * *